United States Patent [19]
DiMaulo

[11] Patent Number: 5,983,503
[45] Date of Patent: Nov. 16, 1999

[54] ROUND FOOD CUTTER

[76] Inventor: Michael A. DiMaulo, 99 Rudolph Ave., Elmwood Park, N.J. 07407

[21] Appl. No.: 09/086,800

[22] Filed: May 29, 1998

[51] Int. Cl.[6] .................................................. A21C 5/08
[52] U.S. Cl. ............................................. 30/114; 30/303
[58] Field of Search .......................... 30/303, 302, 114, 30/315

[56] References Cited

U.S. PATENT DOCUMENTS 4,250,618  2/1981  Custer et al. ........................ 30/303 X

*Primary Examiner*—Douglas D. Watts
*Attorney, Agent, or Firm*—Mathews, Collins, Shepherd & Gould, P.A.

[57] ABSTRACT

A cutting utensil for flat, round foodstuffs comprises a cruciform blade mechanically coupled to a shaft and handle for pushing the blade into the food. A housing encloses the upper and top surfaces of the blade and is coupled to the shaft and handle via a spring so that after cutting, the blade will retract back to a resting position within the housing. In the preferred embodiment, the cruciform blade has eight arms for cutting eight equal sectors, and the housing is star shaped with blade arms directed to the points.

2 Claims, 1 Drawing Sheet

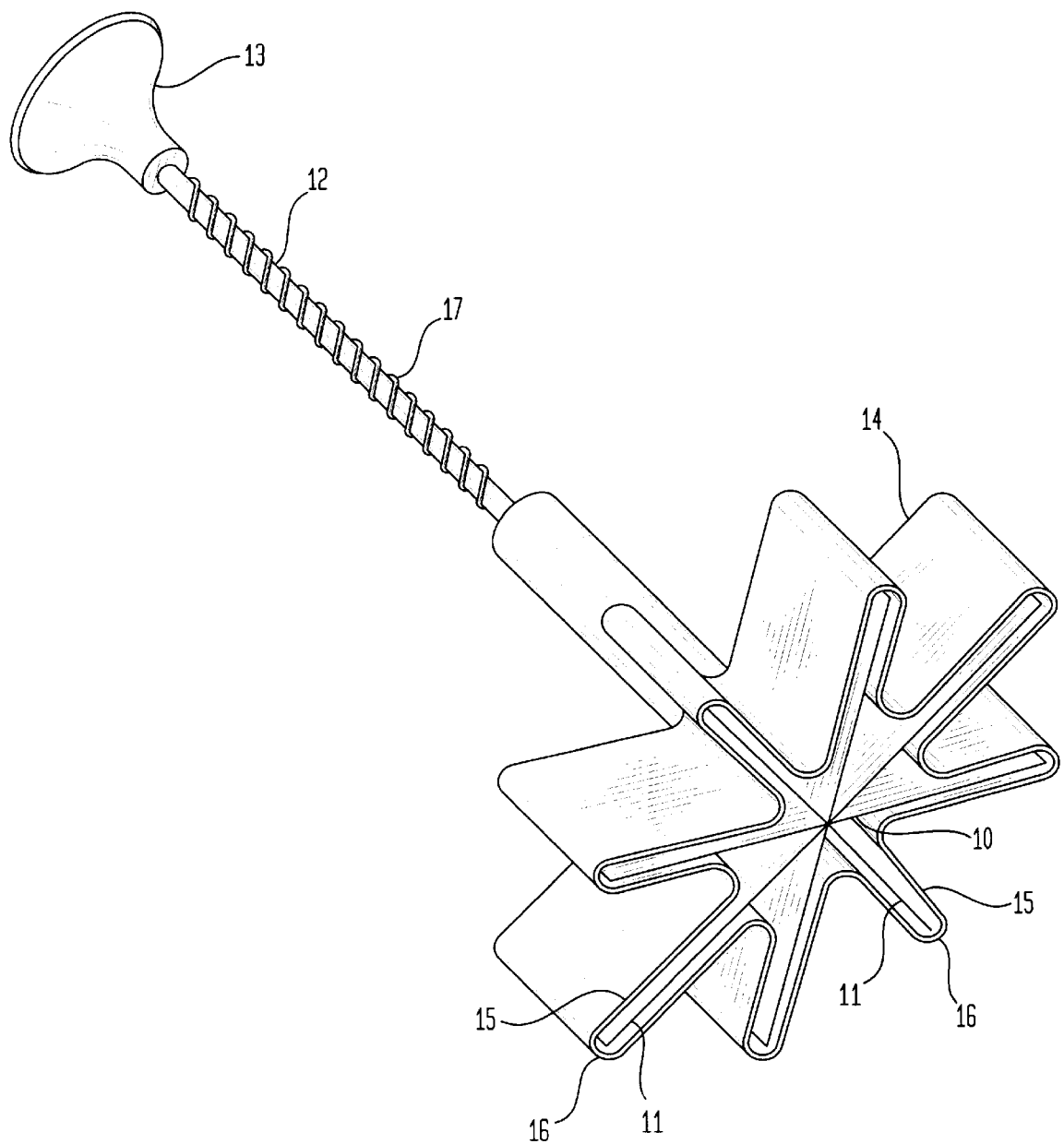

ROUND FOOD CUTTER

FIELD OF THE INVENTION

This invention relates to cutting utensils and, in particular, to a cutting utensil particularly useful for cutting round foods such as pancakes, pies, cakes and the like.

BACKGROUND OF THE INVENTION

There are a wide variety of flat, round foods that must be cut before eating. Examples include pancakes, pies, cakes, and pizzas. With the exception of pancakes, such foods are typically cut by a knife or rolling blade cutter into a plurality of circular sectors (pie shaped slices) to provide individual servings. Pancakes are typically served in stacks of round cakes.

As is well known, cutting such foods with a knife is unexpectedly difficult. Cutting the first piece of a cake often produces a less than aesthetic result, and difficulty in cutting equal size pieces of pie has produced a literature of adages. Accordingly, there is a need for an improved cutting utensil capable of quickly cutting flat, round foodstuffs into a plurality of preferably equal sectors.

SUMMARY OF THE INVENTION

In accordance with the invention, a cutting utensil for flat, round foodstuffs comprises a cruciform blade mechanically coupled to a shaft and handle for pushing the blade into the food. A housing encloses the upper and top surfaces of the blade and is coupled to the shaft and handle via a spring so that after cutting, the blade will retract back to a resting position within the housing. In the preferred embodiment, the cruciform blade has eight arms for cutting eight equal sectors, and the housing is star shaped with blade arms directed to the points.

BRIEF DESCRIPTION OF THE DRAWINGS

The advantages, nature and various additional features of the invention will appear more fully upon consideration of the illustrative embodiments now to be described in detail in connection with the accompanying drawing. The drawing is a perspective view of a cutting utensil.

DETAILED DESCRIPTION

Referring to the drawing, there is shown a perspective view of a cutting utensil 9 for cutting generally flat, round foodstuffs comprising a cruciform blade 10 including a plurality of cutting arms 11 extending radially from the center of the cruciform. The cruciform blade is mechanically coupled, as by welding, to a shaft 12 which, in turn, has a handle 13 for permitting a user to push the blade into foodstuffs via the shaft 12. The elongated shaft extends perpendicular to the plane of the cruciform. The cruciform blade 10 is conveniently housed within a housing 14 which is preferably generally star-shaped, providing a housing arm 15 for each cutting arm 11. Each cutting arm 11 is aligned toward a respective point 16 of the housing star. Advantageously the housing includes a cylindrical opening (not shown) for slideably engaging shaft 12 and a spring 17 around the shaft for biasing the housing to cover the blade.

In use, the utensil provides a fast and easy way to cut round, flat foods such as pancakes. The particular embodiment shown in the drawing will cut a stack of pancakes into eight equal pieces. The device is placed on top of the stack with the handle up. The user presses down on the handle 13, forcing the blade 10 out of the housing 14 and through the pancakes. After cutting and release of pressure on the handle 13, the spring 17 automatically returns the blade 10 into the housing 14. The utensil provides a fast, easy and fun way to cut pie-shaped pieces from a stack of pancakes.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. A cutting utensil for round, generally flat foodstuffs comprising a star-shaped blade comprising a plurality of cutting arms extending radially from a center;

an elongated shaft mechanically secured to said blade, said shaft extending perpendicular to the plane of said blade;

a handle secured to said shaft for pushing said blade via said shaft;

a housing slidably engaging said shaft between said blade and said handle, said housing having a separate housing arm for individually enclosing the upper and top surfaces of each one of the plurality of cutting arms of said blade; and a spring disposed along said shaft between said handle and said housing for biasing said housing to partially enclose said blade.

2. The cutting utensil of claim 1 wherein said housing has the shape of a star with a plurality of points and each cutting arm of said blade is aligned toward a respective point of said star.

* * * * *